(12) United States Patent
Binder et al.

(10) Patent No.: US 6,513,359 B1
(45) Date of Patent: Feb. 4, 2003

(54) FLUID FORM

(76) Inventors: Carsten Binder, Industriestrasse 1, 9473 Gams (CH); Markus Binder, Industriestrasse 1, 9473 Gams (CH)

( * ) Notice: Subject to any disclaimer, the term of this patent is extended or adjusted under 35 U.S.C. 154(b) by 0 days.

(21) Appl. No.: 09/806,192

(22) PCT Filed: Sep. 29, 1999

(86) PCT No.: PCT/EP99/07225

§ 371 (c)(1),
(2), (4) Date: May 21, 2001

(87) PCT Pub. No.: WO00/20143

PCT Pub. Date: Apr. 13, 2000

(30) Foreign Application Priority Data

Oct. 1, 1998  (DE) .......................... 198 45 186

(51) Int. Cl.$^7$ .............................................. B21D 22/10
(52) U.S. Cl. ................... 72/57; 72/55; 72/63; 29/421.1
(58) Field of Search ............................... 72/55, 56, 57, 72/63; 29/421.1

(56) References Cited

U.S. PATENT DOCUMENTS 2,344,743 A  *  3/1944  Smith, Jr. ...................... 72/57
3,672,194 A  *  6/1972  Martin .......................... 72/55
4,748,837 A  *  6/1988  Kurosawa et al .......... 29/421.1
6,178,796 B1 *  1/2001  Hellgren ....................... 72/55

FOREIGN PATENT DOCUMENTS

| DE | 27 30 059 A | 3/1978 |
| DE | 37 09 181 A1 | 9/1988 |
| DE | 39 01 703 C | 8/1989 |
| DE | 196 26 692 A | 1/1998 |
| GB | 2 151 527 A | 7/1985 |
| GB | 2 183 195 A | 6/1987 |

* cited by examiner

*Primary Examiner*—David Jones
(74) *Attorney, Agent, or Firm*—Henry M. Feiereisen

(57) ABSTRACT

A fluid form that is used to produce deep-drawn articles (cf. 10) on any presses, and includes a ram (2), a hold-down plate (3) and a die (4), which can be filled, preferably, with water, wherein the sheet metal (10) to be deep-drawn is guided transversely between die and hold-down plate, should be improved in such a manner that no additional tools are required to trim the deep-drawn articles (cf. 10) and, optionally, for other operations. Hereby, the configuration of the respective fluid form as combination tool (1) is provided for the deep drawing operation and for further operations, such as trimming, wall profiling, notching, perforating or the like.

26 Claims, 3 Drawing Sheets

FLUID FORM

DESCRIPTION

The invention relates to a fluid form used for producing deep-drawn articles on any presses and including a ram, a hold-down plate and a die that can be filled, preferably, with water, wherein the sheet metal to be deep-drawn is guided transversely between the die and the hold-down plate.

Fluid forms of this type are known for some time and have shown their usefulness in practice, in particular because, unlike simple deep-drawing tools, fairly large deep-drawn articles, which also have a complex configuration, can be produced, i.e. deep-drawn articles can be produced which cannot be fabricated by deep-drawing tools without water or the like medium. In view of the marginal wrinkle formation, which projects transversely to the fabrication direction, and in view of the irregular marginal areas in articles made through compression molding, deep-drawn articles and extruded articles, respectively, require a separate trimming operation of the respective workpiece, resulting in an additional working step which incurs additional costs. Even more detrimental and inefficient is the case when the wall surfaces of the deep-drawn article should be fabricated with spatial modifications and/or recesses.

Therefore, it is an object of the invention to provide a fluid form which is so configured as to eliminate the need for additional tools for trimming the deep-drawn article and for possible additional working steps.

The posed object can be attained advantageously by the feature of the main claim, because the configuration of the fluid form as combination tool enables not only to free the deep-drawn article, without additional time and additional costs for tools, from the marginal regions to be eliminated, i.e. from a trimming operation, but one and the same tool can be used to carry out further operations, such as profiling of wall areas, production of notches, perforating of the walls, or the like.

A combination tool most appropriate for practical use is set forth in claim 2. The arrangement of a diaphragm in the partition plane of the respective fluid form for pressing the deep-drawn material against separating and/or shaping constructions on or in the ram of the fluid form effects indeed the above-stated operations, without requiring additional tools. The costs for the diaphragm and the costs for a particular configuration of the respective ram are insignificant, when appropriately appreciating and considering the attained advantages of being able to use one and the same fluid form to carry out operations, for which previously several tools had to be made available, let alone the added time consumption and the resultant particular financial burden.

In particular in conjunction with deep drawing of relatively great depths and difficult configuration, excess strain on or even premature destruction of the normally flat diaphragm can be eliminated when proceeding according to claim 3.

In order to regulate and control the deep drawing operation as such and/or the trimming operation or the like, it is proposed to proceed according to claim 4. This measure enables to work with different pressures so that—as already indicated—not only the deep drawing process can be influenced in situations when the article being produced has a particular configuration but also further operations.

According to claim 5, a separating ram configuration is formed by providing a kind of circumferential predetermined breaking groove. The term "predetermined breaking groove" is selected for the reason that in one or the other case, there may possibly no complete severance of the disturbing wrinkle edge; However, the material is certainly sufficiently weakened so that the useless part can easily be removed. This is also because already relatively slight surface notches lead with certainty to breakage of the intended areas.

In order to improve the effect of the predetermined breaking groove, it is recommended to proceed according to claims 6 and 7.

Removal of the material remaining in the predetermined breaking groove is advantageously implemented by proceeding according to claim 8, because in this way the closed ring is cut open, so that the material can easily be removed with a respective tool. This does not preclude, however, the configuration of the predetermined breaking groove according to claim 9.

In order to ensure a complete severance of the material being sheared off, it is recommended to proceed according to claim 10.

If it is desired to avoid a predetermined breaking groove, it is suitable for the trimming operation, to exploit the feature of claim 11. An improved separation effect can be realized when proceeding according to the features of claim 12.

Also when separating the edge, it is suitable to take into account the strength of the material being separated, as set forth in claim 13.

In the event, further operations are required in addition to trimming, it is proposed to utilize the features of claim 14.

In case, particular forms render a return movement of the ram difficult or prevent a withdrawal of the deep-drawn article from the ram, it is proposed to proceed according to claim 15. A hydraulic actuation of the slides, provided here, is a preferred configuration.

An example of the invention is illustrated in the drawing, in which.

Figure 1:
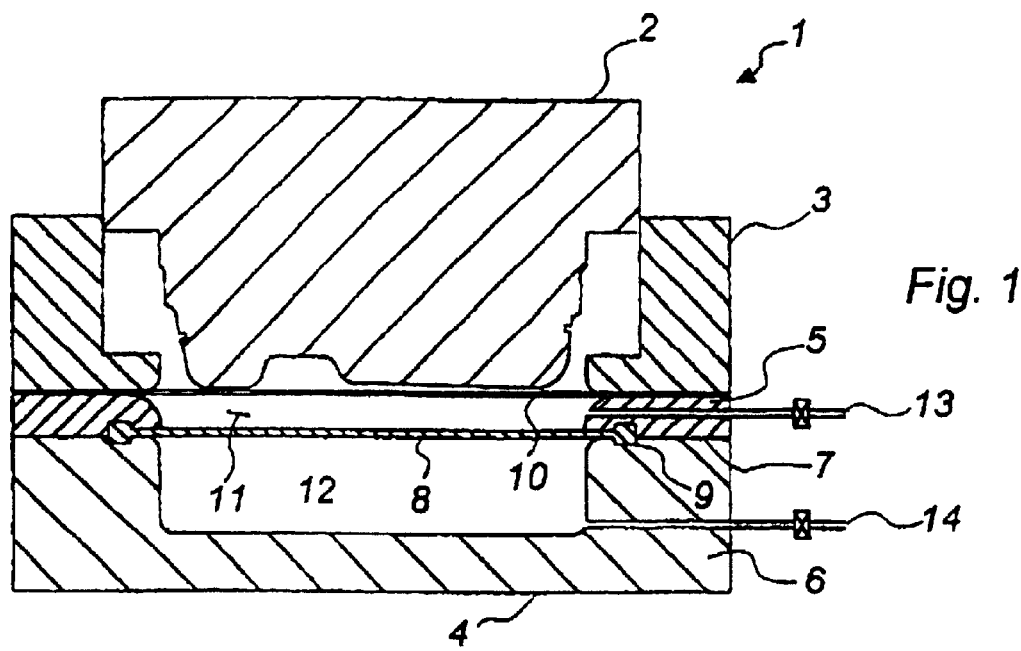
FIG. 1 shows a sectional view of a fluid form according to the invention, with retracted ram.
Figure 2:
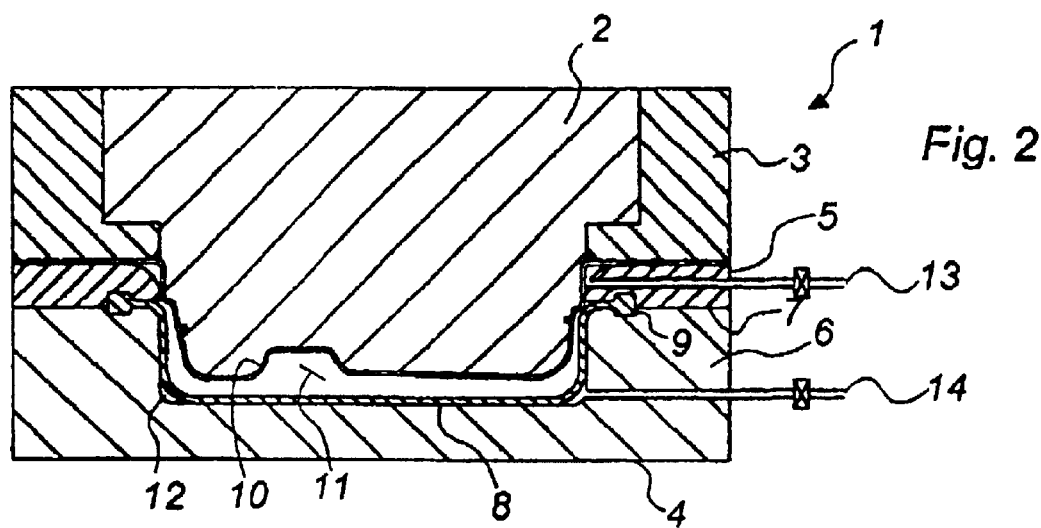
FIG. 2 shows the same fluid form with advanced ram, with the sheet metal not yet fully shaped.
Figure 3:
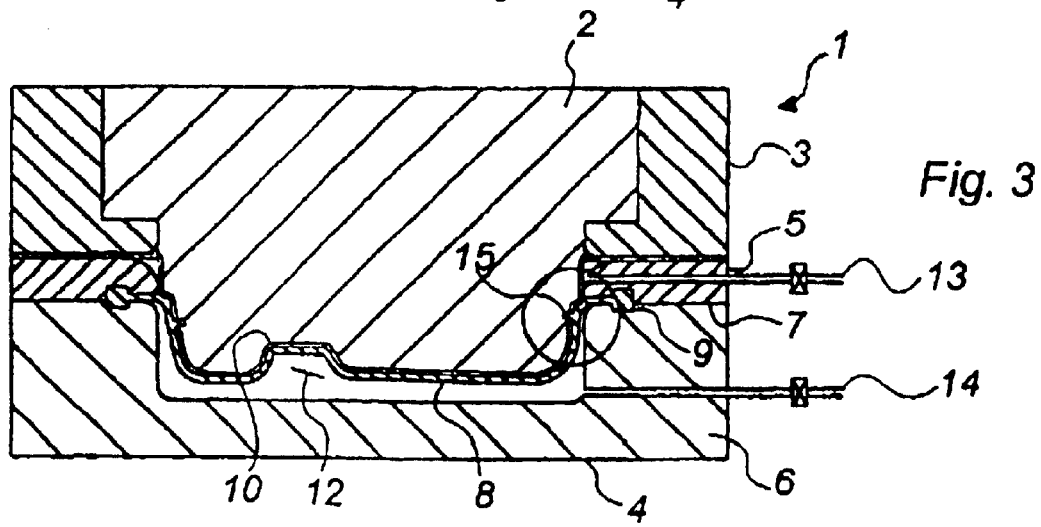
FIG. 3 shows the fluid form with advanced ram, with the sheet metal completely shaped.

As shown in FIGS. 1 to 3, a fluid form 1 includes a ram 2, a hold-down plate 3 and a die 4, which is also called water box. The die 4 is of split configuration and both parts 5, 6 support in the partition plane 7 a diaphragm 8, which is secured in place with circumferential marginal profiles 9 in the parts 5, 6. Guided transversely between the upper part 5 of the die 4 and the hold-down plate 3 is the sheet metal 10 to be deep-drawn.

Spaces 11, 12 defined by the components 6, 8 and 10 are connected via connections 13, 14, which can be controlled and regulated, to a medium, e.g. water, so as to be able to pressurize the spaces separate from one another or to relieve them from pressure, which is relevant for the deep-drawing process.

FIG. 2 shows that through an advance of the ram 2 into the die 4 and change of the water pressure in the spaces 11 and 12, the sheet metal 10 can be brought substantially into contact with the profile of the ram 2, on the one hand, and the diaphragm 8 has assumed approximately the illustrated change in shape. Through respective increase of pressure in the space 12 and through displacement of the water out of the space 11, the diaphragm 8, as shown in FIG. 3, bears snugly against the preformed sheet metal 10 and forces the latter into the final shape while simultaneously separating or trimming as a consequence of a circumferential predetermined breaking groove 15, which is best seen in FIGS. 4 and 5.

The drawing clearly shows the importance of the controllable and regulatable connections 13, 14 for the deep-drawing process which is significantly influenced by the shape being produced. Regarding the strain on the diaphragm, it should be noted that approximately conforming the diaphragm to the cavity 12 prevents destructive stress. Reference is hereby made to FIG. 2. Suffice to say that this conformation should not result in an interference of the medium flow to areas remote to the connection. Likewise, sharp edges of the die 4 should be avoided in areas that come into direct contact with the diaphragm 8.

Figure 4:
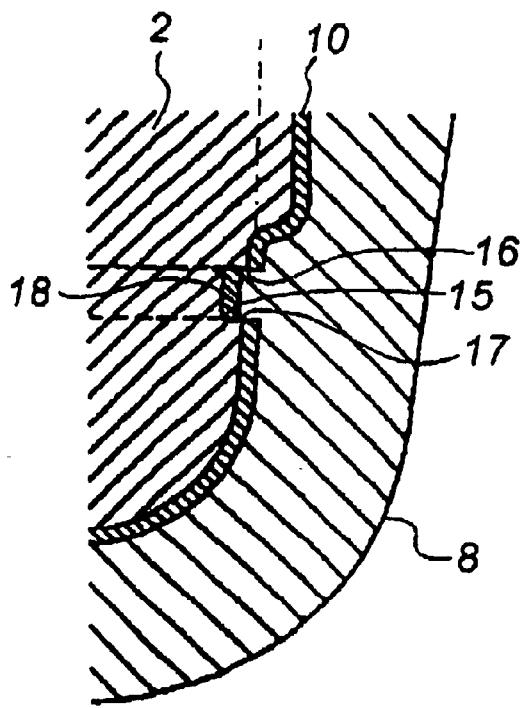
FIG. 4 shows a greatly enlarged detail of FIG. 3 in the area of the circle in FIG. 3, illustrating a predetermined breaking groove.

FIG. 4 shows, on an enlarged scale, that the predetermined breaking groove 15 in the ram 2 has an upper edge 16 and a lower edge 17 so that the diaphragm 2, subjected to strain by the liquid in the space 12, is enabled to sever a circumferential strip 18 from the sheet metal 10, i.e. one and the same tool implements a trimming of the deep-drawn article.

Figure 5:
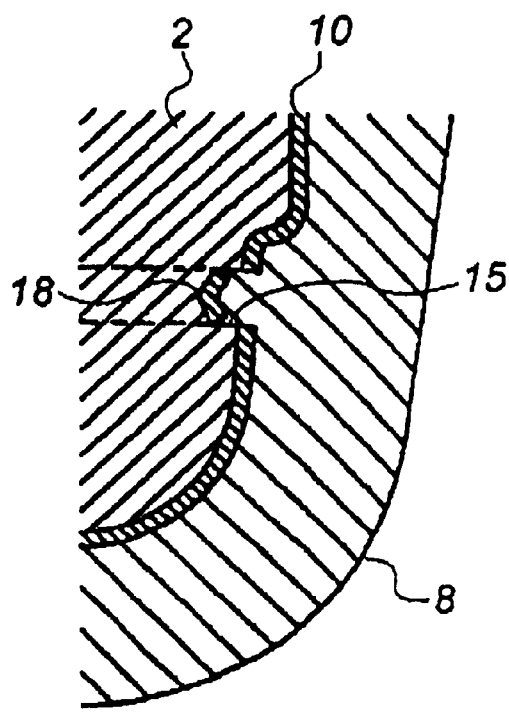
FIG. 5 shows a modified embodiment with respect to FIG. 4.

According to FIG. 5, the predetermined breaking groove 15 has a bottom which is so configured that the circumferential strip 18 becomes narrower by the pressure of the diaphragm 8, so that friction is reduced on the predetermined breaking walls, thereby facilitating the removal of the strip 18 from the groove 15.

Figure 6:
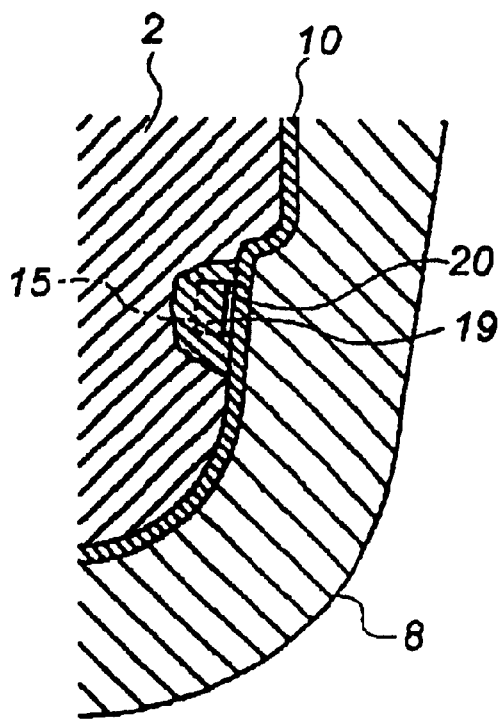
FIG. 6 shows a detail in a predetermined breaking groove.

The circumferential strip 18 can easily be removed according to FIG. 6 when providing in the predetermined breaking groove 15 a separation web 19 which completely or almost completely fills out the depth of the groove and has a cutting edge 20 extending in ram direction.

Figure 7:
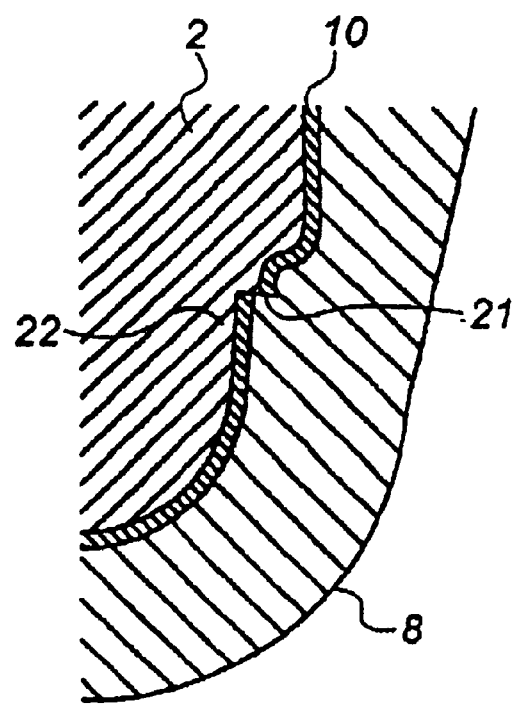
FIGS. 7 and 8 show modified trimming options with respect to a predetermined breaking groove.
Figure 8:
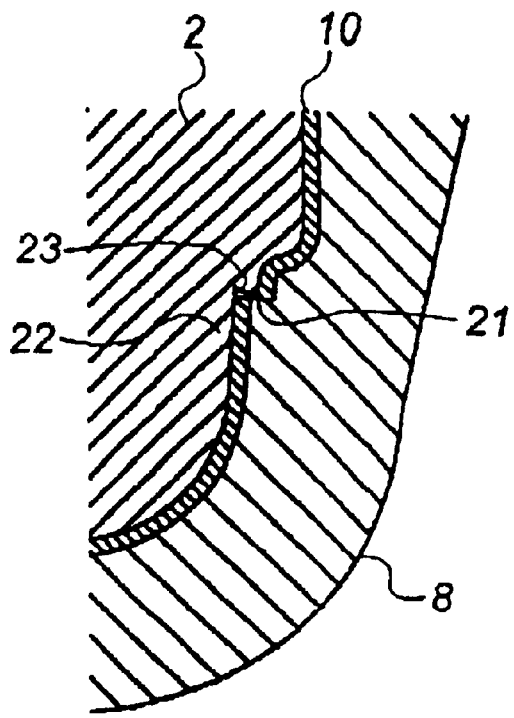

FIGS. 7 and 8 shows two constructions for trimming without a predetermined breaking groove, i.e. such a predetermined breaking groove is replaced by a circumferential edge 21 which projects by at least the thickness of the sheet metal 10 relative to the subjacent ram zones 22. In the embodiment of FIG. 8, the edge 21 is configured as cutting edge following an undercut 23.

Figure 9:
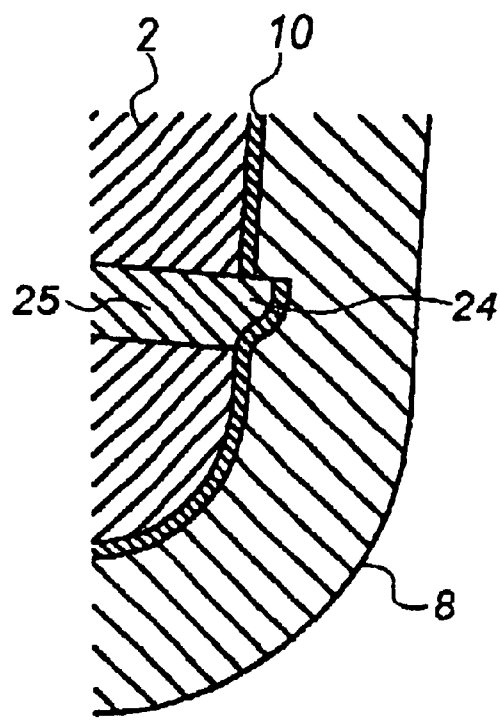
FIG. 9 shows an example for a wall profiling.
Figure 10:
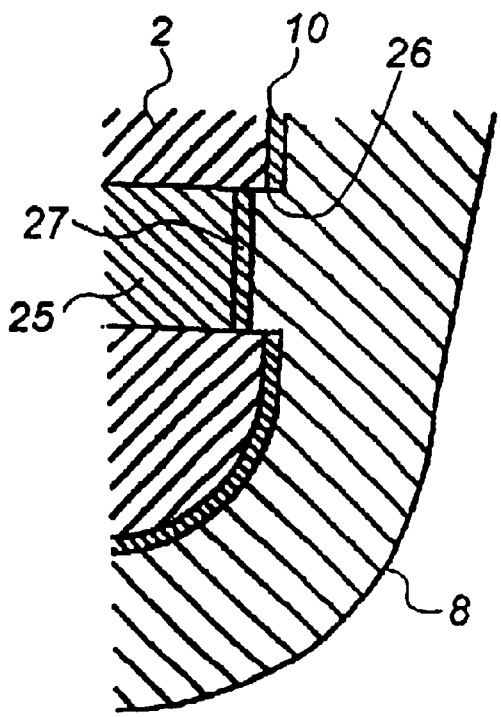
FIG. 10 shows an example for perforating the deep-drawn article.

FIG. 9 shows a wall profiling 24 which is not continuous but provided in only one area or arranged in several areas. Trimming of the deep-drawn article, i.e. of the sheet metal 10, is implemented above the wall profiling 24 and is not shown. In this embodiment, the ram 2 cannot be retracted, slides 25 are provided in a number corresponding to the number of wall profiles 24 and are suitably actuated hydraulically. Slides 25 are also required, when, according to FIG. 10, wall regions of the deep-drawn sheet metal 10 should be perforated or provided with at least one hole 26. Hereby, the slide or slides 25 are also used as ejectors for the severed part 27. Also in this case, trimming is realized with a predetermined breaking groove 15 or with an edge 21, which are not shown.

What is claimed is:

1. A fluid form for producing deep-drawn articles on a press, comprising a die for holding a fluid for use in producing a deep-drawn article of sheet metal, a ram having trimming means and constructed for interaction with the die, and a hold-down plate for securing the sheet metal article in a support plane between the die and the hold-down plate, said die being split at a partition plane to thereby have a bottom part and a top part, said die receiving along the partition plane a diaphragm securely in place, wherein the diaphragm acts via the sheet metal article on the trimming means of the ram, with the bottom part and the top part of the die equipped with controllable and regulatable connections for supply of the fluid.

2. The fluid form of claim 1, wherein the fluid is water.

3. The fluid form of claim 1, wherein the diaphragm has a shape which roughly conforms to one of a recess in the bottom part of the die and a shape of the ram.

4. The fluid form of claim 1, wherein the trimming means of the ram is formed by a circumferential predetermined breaking groove.

5. The fluid form of claim 4, wherein the predetermined breaking groove has an upper and a lower edge.

6. The fluid form of claim 5, wherein at least one edge is formed as cutting edge.

7. The fluid form of claim 4, and further comprising at least one partition web provided in the predetermined breaking groove and extending roughly in a movement direction of the ram.

8. The fluid form of claim 4, wherein the predetermined breaking groove has a depth, and the sheet metal has a thickness, wherein the depth of the breaking groove corresponds to at least the thickness of the deep-drawn sheet metal.

9. The fluid form of claim 1, wherein the trimming means includes a circumferential edge, which projects out with respect to ram regions of the ram positioned below the circumferential edge.

10. The fluid form of claim 9, wherein the circumferential edge is formed as a cutting edge by terminating in an undercutting lower ram portion.

11. The fluid form of claim 9, wherein the circumferential edge is spaced on the ram transversely to a movement direction of the ram from the ram regions at a distance which corresponds at least to a thickness of the deep-drawn sheet metal.

12. The fluid form of claim 1, wherein the ram is provided with forming and/or trimming means in areas beneath the circumferential trimming member.

13. The fluid form of claim 12, and further comprising hydraulic slides provided in the ram and complementing a configuration of the forming and/or trimming means.

14. The fluid form of claim 1, wherein the diaphragm acts in the final shaping stage via the sheet metal on forming means of the ram.

15. Apparatus for shaping an article, comprising:
   a split die defining a partition plane and having a cavity destined for filling with a fluid;
   a hold-down plate for securing a sheet metal above the partition plane of the die, with the sheet metal extending across the cavity;
   a ram for forcing the sheet metal into the cavity of the die against a pressure of the fluid, said ram having trimming means;
   a diaphragm separating the cavity into two chambers and secured to the die in the partition plane, said diaphragm interacting with the trimming means of the ram for severing a marginal area of the sheet metal; and fluid-supply means for controlled supply of fluid into the chambers.

16. The apparatus of claim 15, wherein the fluid is water.

17. The fluid form of claim 15, wherein the trimming means of the ram is formed by a circumferential predetermined breaking groove.

18. The fluid form of claim 17, wherein the predetermined breaking groove has at least one edge formed as cutting edge.

19. The fluid form of claim 17, and further comprising at least one partition web provided in the predetermined breaking groove and extending roughly in a movement direction of the ram.

20. The fluid form of claim 17, wherein the predetermined breaking groove has a depth, and the sheet metal has a thickness, wherein the depth of the breaking groove corresponds to at least the thickness of the sheet metal.

21. The fluid form of claim 15, wherein the trimming means includes a circumferential cutting edge formed by an interior shoulder of the die and extending offset to subjacent ram regions.

22. The fluid form of claim 21, wherein the cutting edge has a width, and the sheet metal has a thickness, wherein the width of the cutting edge corresponds to the thickness of the sheet metal.

23. The fluid form of claim 15, and further comprising hydraulic slides slidably guided in the ram for forming particular profiles of the sheet metal.

24. A method of shaping an article, comprising the steps of:

filling a fluid into two chambers separated from one another by a diaphragm in a die cavity;

pre-forming a blank by forcing the blank with a ram into the die cavity in the direction of a diaphragm against a pressure of a fluid contained in one chamber while withdrawing fluid from the other chamber, thereby deforming the diaphragm; and final shaping of the blank by introducing fluid into the other chamber, so that the diaphragm forces the blank against the ram while severing a marginal area of the blank through interaction with the ram.

25. The method of claim 24, and further comprising the step of profiling the blank during the final shaping step.

26. The method of claim 25, wherein the profiling step is an operation selected from the group consisting of wall profiling, notching and perforating.

* * * * *